United States Patent [19]

Kamiyama

[11] Patent Number: 4,847,743
[45] Date of Patent: Jul. 11, 1989

[54] PWM INVERTER SYSTEM

[75] Inventor: Isao Kamiyama, Hyogo, Japan

[73] Assignee: Mitsubishi Denki Kabushiki Kaisha, Tokyo, Japan

[21] Appl. No.: 195,801

[22] Filed: May 19, 1988

[30] Foreign Application Priority Data

May 20, 1987 [JP] Japan .................................. 62-124654

[51] Int. Cl.⁴ .............................................. H02M 1/12
[52] U.S. Cl. ........................................ 363/41; 363/98; 363/132
[58] Field of Search ........................ 363/41, 56, 97, 98, 363/132

[56] References Cited

U.S. PATENT DOCUMENTS

| | | | |
|---|---|---|---|
| 4,312,031 | 1/1982 | Kudor | 363/41 |
| 4,617,675 | 10/1986 | Ashikaga et al. | 363/41 |
| 4,720,777 | 1/1988 | Yokoi | 363/41 |
| 4,729,082 | 3/1988 | Sato | 363/41 |
| 4,763,060 | 8/1988 | Takahashi | 363/41 |

FOREIGN PATENT DOCUMENTS 59-251001  5/1986  Japan.

OTHER PUBLICATIONS

"Inverter Application Manual", pp. 28–34, Sep. 7, 1985.

Primary Examiner—Peter S. Wong
Attorney, Agent, or Firm—Bernard, Rothwell & Brown

[57] ABSTRACT

A PWM inverter system which eliminates a switching loss and minimizes the distortion ratio of the output voltage thereof. The PWM inverter system includes a first means for producing switching signals for 3-phase modulation by which switching elements for each phase make a switching operation, a second means for producing switching signals for 2-phase modulation by which a switching operation for one phase is unnecessary, and a change-over for changing over the two means in response, for example, to a magnitude value of the inverter output voltage.

2 Claims, 5 Drawing Sheets

|    | $\vec{0}$ | $\vec{V_1}$ | $\vec{V_2}$ | $\vec{0}$ | $\vec{V_2}$ | $\vec{V_1}$ |
|----|-----------|-------------|-------------|-----------|-------------|-------------|
| Sa | 0 (1) | 1 | 1 | 1 (0) | 1 | 1 |
| Sb | 0 (1) | 0 | 1 | 1 (0) | 1 | 0 |
| Sc | 0 (1) | 0 | 0 | 1 (0) | 0 | 0 |

|    | $\vec{V_1}$ | $\vec{V_2}$ | $\vec{0}$ | $\vec{0}$ | $\vec{V_2}$ | $\vec{V_1}$ |
|----|-------------|-------------|-----------|-----------|-------------|-------------|
| Sa | 1 | 1 | 1 (0) | 1 (0) | 1 | 1 |
| Sb | 0 | 1 | 1 (0) | 1 (0) | 1 | 0 |
| Sc | 0 | 0 | 1 (0) | 1 (0) | 0 | 0 |

PWM INVERTER SYSTEM

BACKGROUND OF THE INVENTION

1. Field of the Invention

This invention relates to a PWM (Pulse Width Modulation) inverter system for producing a desired multi-phase ac output from a dc input by on-off controlling a switching element such as, for example, a transistor, and more particularly to production of a switching signal, that is, a PWM signal for causing an on-off operation.

2. Prior Art

Conventionally, a typical method of producing an PWM signal involves comparison of a sinusoidal wave signal which is each phase voltage instruction with a triangular wave signal which is a modulating wave. The principle of the method is described, for example, taking a single phase inverter of a full bridge as an example in "Inverter Application Manual" p.p. 28 to 34, published on Sept. 7, 1985 (hereinafter referred to as prior art 1). Of late, a method is already known wherein a PWM signal of a multi-phase inverter is treated as composition of space voltage vectors. According to the method, on-off times of individual switching elements are controlled such that a time average vector for a unit time may coincide with an instruction value of a desired instantaneous voltage vector (Japanese patent application No. 59-251001, which will be hereinafter referred to as prior art 2).

Figure 1:
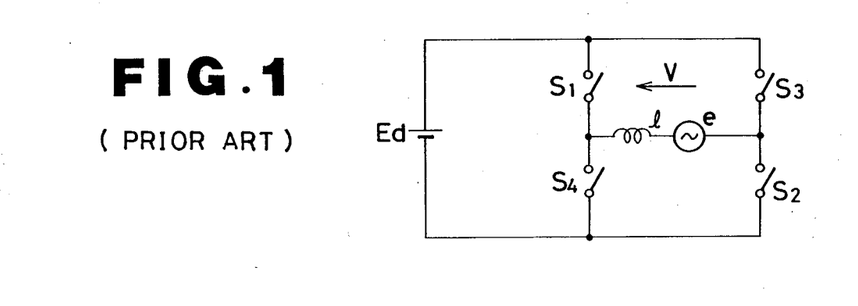
FIG. 1 is a circuit diagram showing a main circuit of a single phase inverter.
Figure 2:
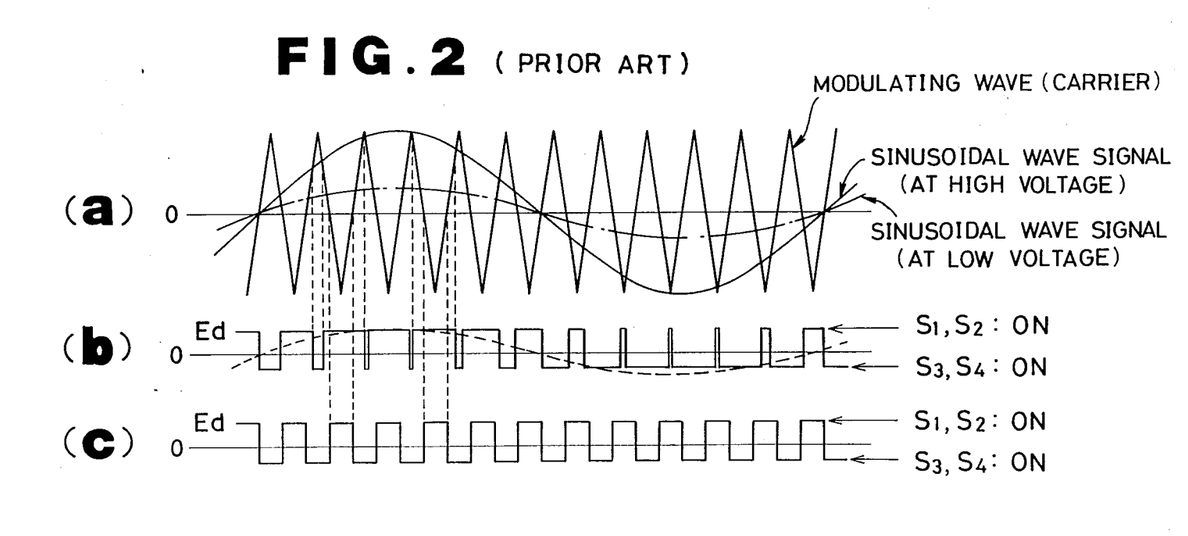
FIG. 2 is a diagram illustrating a conventional PWM signal producing method.

FIG. 1 shows a circuit construction of a single phase inverter of the prior art 1. In FIG. 1, reference symbols $S_1$ to $S_4$ denote each a switching element such as a transistor, and FIG. 2 illustrates a process of producing switching signals (on-off signals) to be coupled to the switching elements. Referring to FIG. 2, (a) shows a relationship between a sinusoidal wave signal and a triangular wave which is a modulating wave, and a sinusoidal wave signal when the magnitude thereof is great, that is, upon outputting of a high voltage, is indicated by a solid line while a sinusoidal wave upon outputting of a low voltage is indicated by a chain line. Meanwhile, (b) of FIG. 2 shows on-off signals of the individual switching elements upon outputting of the high voltage while (c) of FIG. 2 shows on-off signals upon outputting of the low voltage.

Now, the prior art 2 will be described with reference to FIGS. 3 to 8.

Figure 3:
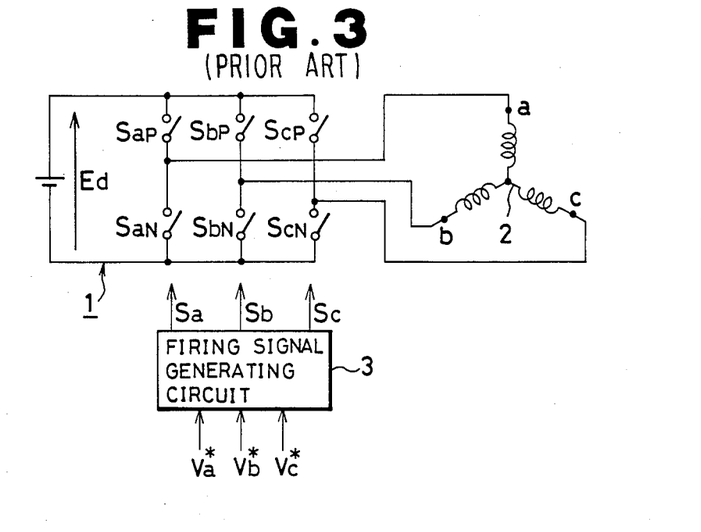
FIG. 3 is a circuit diagram showing a circuit of a 3-phase inverter system.

Referring to FIG. 3, a main circuit 1 of a 3-phase inverter of the PWM control method (hereinafter referred to simply as inverter) includes switching elements $S_{aP}$, $S_{bP}$, $S_{cP}$, $S_{aN}$, $S_{bN}$ and $S_{cN}$ such as transistors connected in a bridge circuit. The inverter 1 is connected to primary windings 2 of a 3-phase induction motor serving as a load to the inverter 1, and also to a firing signal generating circuit 3 for producing a firing signal for turning the switching elements on and off.

Figure 4:
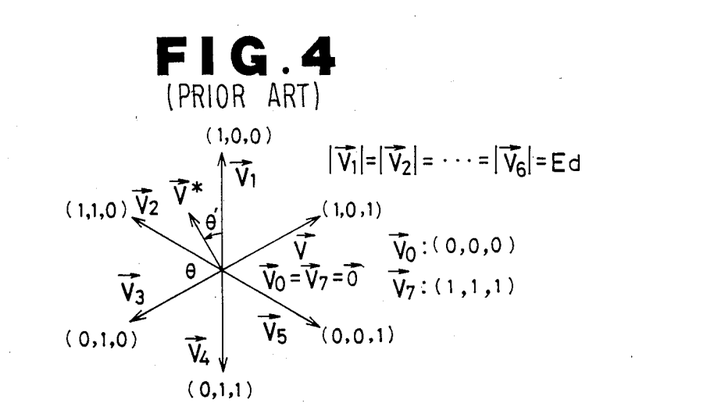
FIG. 4 is a voltage vector diagram of the 3-phase inverter system of FIG. 3.

The voltage vectors V which are produced when a voltage to be applied to the 3-phase load shown in FIG. 3 is supplied from the inverter 1 only include such discrete voltage vectors $V_0$ to $V_7$ corresponding to on-off states of the switching elements of the inverter 1 as seen in FIG. 4. It can be considered that the PWM inverter produces equivalent continuous voltage vectors by switching such discrete voltage vectors at a high speed. Symbols (0, 0, 0), (1, 0, 0), . . . , and (1, 1, 1) in FIG. 4 represent on-off states of switching element pairs $S_a$ ($S_{aPLL}$, $S_{aN}$), $S_b$ ($S_{bP}$, $S_{bN}$) and $S_c$ ($S_{cP}$, $S_{cN}$), wherein symbol 1 represents that the switching element indicated by the suffix P is on and the switching elements indicated by the suffix N is off while symbol 0 represents an individually reverse state. However, (1, 1, 1) and (0, 0, 0) both represent a short-circuited condition wherein the load terminals are short-circuited by the switching elements, and the voltage vectors then are the zero vector having a magnitude equal to zero.

The prior art 2 describes such combinations and producing times of the voltage vectors $V_0$ to $V_7$ that an average voltage vector in a unit time $T_1$ of discrete voltage vectors may coincide with a desired arbitrary instantaneous voltage vector. When, for example, a voltage vector $V^*$ of a magnitude $|V^*|$ is to be produced in a region defined by and between the vectors $V_1$ and $V_2$ in FIG. 4, the voltage vectors $V_1$, $V_2$ and 0 are produced with producing times $T_a$, $T_b$ and $T_o$ which are defined respectively by the following expressions:

$$\begin{aligned}
\frac{T_a}{T_I} &= K \cdot |V^*| \cdot \sin(\theta' + 2\pi/3) \\
\frac{T_b}{T_I} &= K \cdot |V^*| \cdot \sin\theta' \\
\frac{T_o}{T_I} &= 1 - K \cdot |V^*| - \sin(\theta' + 2\pi/3)
\end{aligned} \quad (1)$$

where $T_a + T_b + T_o = T_I$, and $\theta'$, is an angle of $V^*$ from $V_1$ and K is a coefficient including an input dc voltage Ed.

Figure 5:
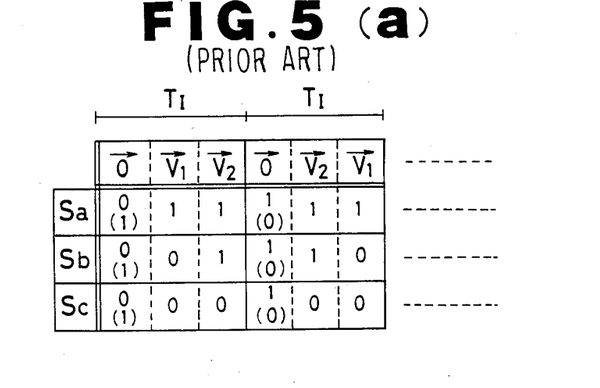
FIGS. 5a to 5b are transition view of switching states.

The order of production of discrete voltage vectors $V_1$, $V_2$ and 0 are not limited at all from the principle of the average in time. In particular, an average voltage vector becomes identical whether the vectors are changed over in an order of $V_1 \to V_2 \to 0$ or in another order of $0 \to V_2 \to V_1$ with the times provided at the time $T_I$ by the equations (1) above, and accordingly an identical average vector is obtained in an arbitrary changing over order. In this instance, however, transitions of the on-on states (switching transitions) of the switching elements are different from each other. FIG. 5 shows an example of switching transitions of the individual switching element pairs $S_a$, $S_b$ and $S_c$ when the following two changing over orders are employed in two successive unit times $2 \cdot T_I$.

$0 \to V_1 < V_2 \to 0 \to V_2 \to V_1$     (a)

$V_1 \to V_2 \to 0 \to 0 \to V_2 \to V_1$     (b)

Here, the 0 vector can take two switching states of (0, 0, 0) and (1, 1, 1). However, in case such switching operations as put in parentheses in (a) and (b) of FIG. 5, the switching element pair $S_b$ makes twice switching operations both in the case of (a) and (b). Accordingly, it is not preferable in that the loss by the elements or the loss by the driving circuit involved in the switching operations will increase or will concentrate upon a particular phase. Further, comparison between the switching transition views of (a) and (b) of FIG. 5 reveals that while each phase switching element makes, in the case of (a), a switching operation once within the period of $2 \cdot T_I$, the switching element pair $S_a$ maintains the state of 1 in the case of (b) and is not required to make a switching operation so that averaging is attained by switching of each of the switching element pairs $S_b$ and $S_c$ once. Accordingly, the case of (b) of FIG. 5 is advantageous from the point of view of the loss described above.

Thus, switching signlas which cause such switching transitions required for switching operations for all the three phases as in the case of the switching transition view (a) of FIG. 5 will be hereinafter referred to as 3-phase demodulation switching signals and such 3-phase modulation as described just above will be hereinafter referred to only as 3-phase modulation while switching signals which do not require a switching operation for one phase as in the case of the switching transition view (b) of FIG. 5 will be hereinafter referred to as 2-phase modulation switching signals and such 2-phase modulation will be hereinafter referred to only as 2-phase modulation. Thus, when the triangular wave comparison method of the prior art 1 is applied to a 3-phase inverter, the switching transition then takes the transition pattern of (a) of FIG. 5 and makes 3-phase modulation. As well known in the art, such 2-phase modulation as described above is recently more advantageous than comparison of a sinusoidal wave signal with a triangular wave with respect to voltage utilizing rate (ratio of a maximum ac output voltage to a dc voltage input) and effective value of high frequency components.

Figure 6:
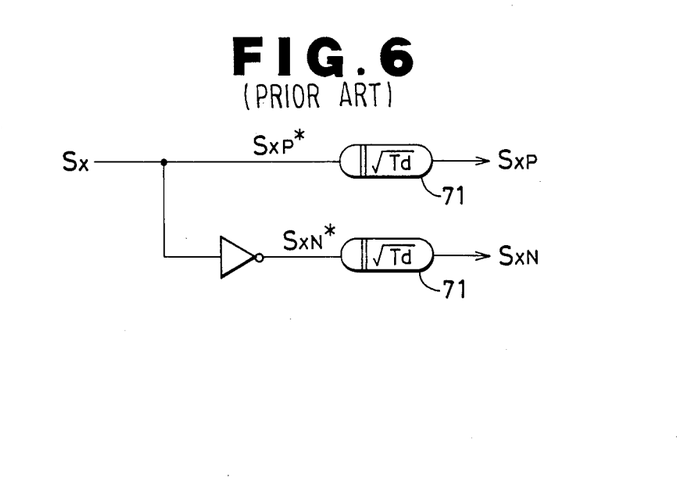
FIG. 6 is a circuit diagram showing an example of short-circuiting preventing circuit.

If the switching elements of each of the switching element pairs $S_a$ ($S_{aP}$, $S_{aN}$), $S_b$ ($S_{bP}$, $S_{bN}$) and $S_c$ ($S_{cP}$, $S_{cN}$) are turned on at the same time, then the dc voltage Ed is short-circuited to cause breakdown of the switching elements. Accordingly, the switching elements of each switching element pair must be controlled such that one of them may assume the on state when the other assumes the off state. In this instance, however, when a switching element is turned from the on state to the off state, there is some delay which arises in the drive circuit for the switching element or in the switching element itself. Accordingly, a short-circuiting preventing circuit is required for delaying a signal for turning on the other element at a time other than its regular timing. FIG. 6 shows an example of such a short-circuiting preventing circuit for one phase. The short-circuiting preventing circuit of FIG. 6 operates to delay the turning on signal for a switching element connected thereto by a predetermined interval of time $T_d$ by means of an on delay element 71. In FIG. 6, symbols $S_x$ represents a switching signal, $S_{xP}{}^*$ a positive side switching signal, $S_{xN}{}^*$ a negative side switching signal, $S_{xP}$ a positive side turning on signal, and $S_{xN}$ a negative side turning on signal. Accordingly, the turning on signal for each of the switching elements is modified by such a non-linear element as described above.

Figure 7:
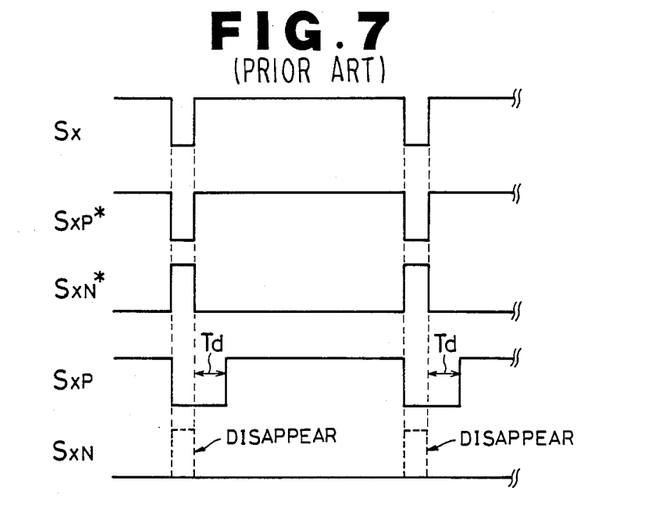
FIGS. 7 and 8 are waveform diagrams illustrating a waveform modifying action of the short-circuiting preventing circuit of FIG. 6.

In the case of the 2-phase modulation, there is a problem that the influence of the modification is so great that the distortion rate of the inverter output voltage becomes very high in a low voltage region wherein the rate of the producing time of the zero vector 0 is high. Description of this will be given below. Referringto the switching transition view for the 2-phase modulation shown in (b) of FIG. 5, as the producing time $T_0$ of the zero vector 0 increases and the rate of the times $T_a$ and $T_b$ decreases, the times when the switching elements $S_b$ and $S_c$ continue the state of 0 decrease. Signals of the short-circuiting preventing circuit when such switching signals (PWM signals) are requested are illustrated in FIG. 7 wherein the turning on signal $S_{xN}$ of the switching element on the negative side disappears due to the short-circuiting preventing period $T_d$ and always presents the off state. Further, since all of the turning on signals having a pulse width smaller than the short-circuiting preventing period $T_d$ apparently disappear, the distortion rate of the output voltage increases remarkably due to the fact that the desired output voltage is low because it is impossible to control the output voltage by fine adjustment of the pulse width then. Due to this influence, particularly when power is supplied to a reactance load such as an induction motor, the distortion of the load current is so great that the induction motor cannot be operated stably because the frequency and the voltage have a proportional relationship and accordingly it is in a region wherein the reactance value is very small.

Further, even if a current minor loop for detecting a load current to change a voltage instruction value to cause the deviation from a current instruction value to be reduced to zero is added, disappearance of the pulses will act as a kind of blind sector. Accordingly, an effect of improvement in waveform by the minor loop cannot be anticipated and an unstable element of the system may be provided to increase the current distortion.

SUMMARY OF THE INVENTION

This invention has been made to eliminate the problems described above, and it is an object of the present invention to provide a PWM inverter system which has advantages in switching loss, voltage utilizing ratio and higher harmonic effective value when switching signals are produced by 2-phase modulation and wherein it is hardly influenced by modification of switching signals by an influence of a short-circuiting preventing circuit and so on and an output can be produced which is low in distortion rate even in a low voltage output region.

In order to attain the object, according to the present invention, a PWM inverter system comprises a first means for producing switching signals by which, while the switching elements for each phase make a switching operation once, the switching elements for another phase may be switched at least once, a second means for producing switching signals by which there is at least one phase for which a switching operation is not effected only once while a switching operation is effected for any other phase, and a change-over means for changing over between the first means and the second means.

Accordingly, when the on-off duty ratio of switching signals by 2-phase modulation increases and the influence by a short-circuiting preventing circuit and so on increases, the PWM inverter system may be changed over to 3-phase modulation. Accordingly, advantages of control by 2-phase modulation and advantages of control by 3-phase modulation can be both utilized.

DETAILED DESCRIPTION OF THE PREFERRED EMBODIMENTS

Now, an embodiment of the present invention will be described with reference to the drawings.

Figure 9:
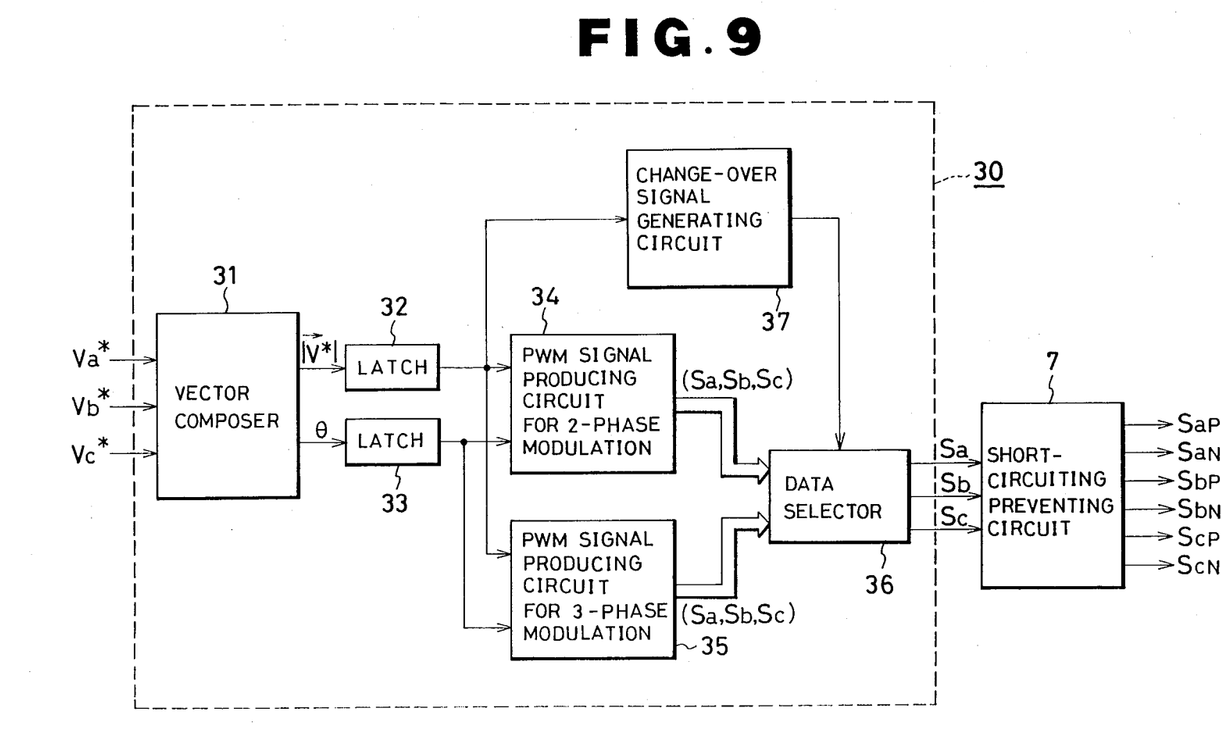
FIG. 9 is a block circuit diagram showing an embodiment of the present invention.

Referring to FIG. 9, a circuit iof a PWM inverter system of the present invention include a vector composer 31 which calculates an instruction value V* of an instantaneous voltage vector from phase voltage instantaneous value instruction values $V_a^*$, $V_b^*$ and $V_c^*$ and outputs a magnitude $|V^*|$ of the vector V* and an angle $\theta$ of the vector from a reference direction. A latch circuit 32 is provided to latch the magnitude $|V^*|$, and another latch circuit 33 is provided to latch the angle $\theta$. The latch circuits 32 and 33 take data in at intervals of a unit time $T_I$ and hold the data for the time of $T_I$ to effect averaging of voltage vectors. A PWM signal producing circuit 34 serving as a second means is provided for producing a PWM signal for 2-phase modulation, and another PWM signal producing circuit 36 serving as a first means is provided for producing a PWM signal for 3-phase modulation. A data selector 36 and a change-over signal generating circuit 37 which serves as a change-over means are also provided. A firing signal generating circuit 30 of the PWM inverter is thus constituted from the components 31 to 37.

Subsequently, operation of the system will be described.

The PWM signal producing circuit 34 for 2-phase modulation produces switching signals which provide, for example, a switching mode making the switching transition view indicated in (b) of FIG. 5. Meanwhile, the PWM signal producing circuit 35 for 3-phase modulation produces switching signals which provide, for example, a switching mode making the switching transition view indicated in (a) of FIG. 5. The switching signals are transmitted to the data selector 36 at the next stage. As described hereinabove, modification of switching signals for 2-phase modulation to a greater degree arises from the fact that there is a phase which is high in on-off duty ratio. This means that the rate of the producing time $T_0$ of the zero vector 0 increases, and is also equivalent to reduction in magnitude of the inverter output voltage. Accordingly, the PWM system is switched from 2-phase modulation to 3-phase modulation when $|V^*|$ becomes lower than a particular value depending upon the magnitude V* of a voltage vector instruction value corresponding uniquely to the magnitude of the inverter output voltage. The change-over signal generating circuit 37 delivers a change-over signal to the data selector 36 when $|V^*|$ becomes lower than the particular value. In response to the change-over signal, the data selector 36 delivers a change-over signal to a short-circuiting preventing circuit 7 to change over from 2-phase modulation to 3-phase modulation.

Figure 8:
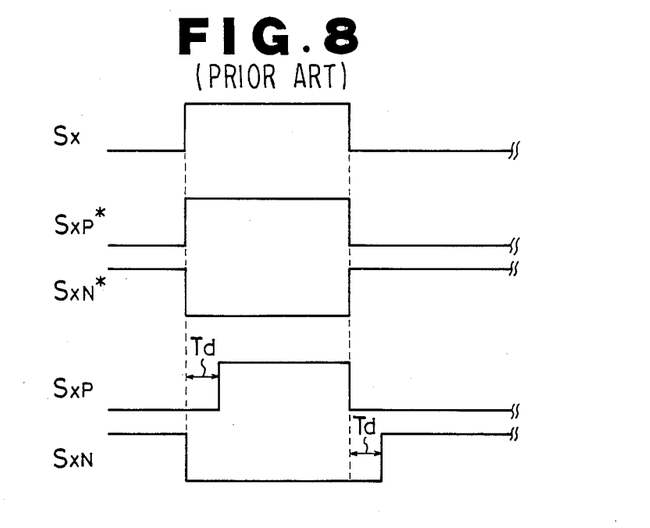

While an example of switching mode in 3-phase modulation is illustrated in (a) of FIG. 5, here if a case where the rate of the producing time $T_0$ of the zero vector 0 is examined, it can be recognized that the ratio between the switching states 0 and 1 of the individual phases of the switching element pairs $S_a$, $S_b$ and $S_c$ approaches 1. This can be seen from the fact that, depending upon comparison between (b) and (c) of FIG. 2, the duty of switching signals approaches 50% as the voltage becomes lower. Modification when such pulses as described above are coupled to the short-circuiting preventing circuit 7 is illustrated in FIG. 8. In the case of 3-phase modulation, disappearance of pulses as in 2-phase modulation (FIG. 7) does not occur because the on-off pulse width increases as the voltage becomes lower. However, since turning on of the switching elements $S_{xP}$ and $S_{xN}$ is delayed by $T_d$, it cannot be said that there is no influence of it. It is possible, however, to finely adjust the widths of on and off pulses, and the influence can be reduced considerably compared with 2-phase modulation wherein on pulses having a width smaller than $T_d$ disappear completely. Further, the possibility of such fine adjustment means that the influence can be compensated for by addition of a current minor loop, and this is a great advantage over the fact that 2-phase modulation produces a blind sector.

It is to be noted that while in the embodiment described above the method of the prior art 2 is employed as a PWM modulation producing method, any other method may be employed only if 3-phase and 2-phase modulating signals are produced by the method.

Further, while the change-over signal generating circuit 37 receives and monitors the magnitude $|V^*|$ of a voltage vector instruction value, the switching is made for the object of avoiding, in short, in 2-phase modulation that the widths of on pulses of individual switching signals decrease by increase of the zero vector 0 and may be any amount which corresponds to a switching state. For example, such a constitution may also be available that various amounts such as a frequency instruction signal or a zero vector producing time $T_0$ are received and monitored.

As apparent from the foregoing description, according to the present invention, 2-phase modulation and 3-phase modulation are changed over from one to the other or vice versa. Accordingly, the distortion ratio of the output voltage of the inverter can be prevented from becoming extremely high so that a stabilized operation of the PWM inverter system can be attained. Further, the PWM inverter system is also advantageous in that the ratio of the ac output voltage to the input dc voltage can be increased and besides the switching loss can be reduced.

What is claimed is:

1. A PWM inverter system which includes a controlling means for receiving a dc voltage and for controlling two groups of switching elements a first group of said switching elements having one end of each switching element connected to the positive side of said dc voltage and a second group of said switching elements having one end of each switching element connected to the negative side and said dc voltage and wherein in one condition in which all of said first group of switching elements are in the on state at the same time, and in another condition in which all of said second group of switching elements are in the on state at the same time, and a further condition in which all of said switching elements of said first group of said switching elements and said second group of said switching elements are not in the on state at the same time are combined and the duration of the output voltage, comprising a first means for producing switching signals by which, while the switching elements for each phase make a switching operation once, the switching elements for another phase may be switched at least once, a second means for producing switching signals by which there is at least one phase for which a switching operation is not effected while a switching operation is effected for any other phase, and a change-over means for changing over between said first means and said second means.

2. A PWM inverter system according to claim 1, wherein said change-over means makes a changing over operation in response to a parameter of operation of the inverter.

* * * * *

UNITED STATES PATENT AND TRADEMARK OFFICE
CERTIFICATE OF CORRECTION

PATENT NO. : 4,847,743  Page 1 of 2
DATED : July 11, 1989
INVENTOR(S) : ISAO KAMIYAMA It is certified that error appears in the above-identified patent and that said Letters Patent is hereby corrected as shown below:

```
Col. 1, line 13, "an" should be --a--;
Col. 1, line 57, "v" should be --$\vec{v}$--;
Col. 1, line 60, "v₀ to v₇" should be --$\vec{v}_0$ to $\vec{v}_7$--;
Col. 1, line 67, "S_aPLL" should be --S_aP--.
Col. 2, line 9,  "v₀ to v₇" should be --$\vec{v}_0$ to $\vec{v}_7$--;
Col. 2, line 13, "v*" should be --$\vec{v}$*--; same line,
                 "|v*|" should be --|$\vec{v}$*|--;
Col. 2, line 15, "v₁ and V₂" should be --$\vec{v}_1$ and $\vec{v}_2$--;
Col. 2, line 29, "v*" should be --$\vec{v}$*--;
Col. 2, line 30, "v₁" should be --$\vec{v}_1$--;
Col. 2, line 32, "v₁, v₂ and 0" should be --$\vec{v}_1$, $\vec{v}_2$ and $\vec{0}$--;
Col. 2, line 36, "v₁→v₂→0" should be --$\vec{v}_1$→$\vec{v}_2$→$\vec{0}$--;
Col. 2, line 37, "0→v₂→v₁" should be --$\vec{0}$→$\vec{v}_2$→$\vec{v}_1$--;
Col. 2, line 48, "0→v₁<v₂→0→v₂→v₁" should be
                 --$\vec{0}$→$\vec{v}_1$→$\vec{v}_2$→$\vec{0}$→$\vec{v}_2$→$\vec{v}_1$--;
Col. 2, line 50, "v₁→v₂→0→0→v₂v₁" should be
                 --$\vec{v}_1$→$\vec{v}_2$→$\vec{0}$→$\vec{0}$→$\vec{v}_2$→$\vec{v}_1$--;

Col. 2, line 15, "V₁,V₂ and 0" should read --$\vec{V}_1$,$\vec{V}_2$ and $\vec{0}$--
```

UNITED STATES PATENT AND TRADEMARK OFFICE
CERTIFICATE OF CORRECTION

PATENT NO. : 4,847,743

DATED : July 11, 1989

INVENTOR(S) : ISAO KAMIYAMA

It is certified that error appears in the above-identified patent and that said Letters Patent is hereby corrected as shown below:

Col. 3, line 56, "O" should be --$\overset{\rightarrow}{O}$--;
Col. 3, line 57, "Referringto" should be --Referring to--;
Col. 3, line 60, "O" should be --$\overset{\rightarrow}{O}$--.
Col. 5, line 7, "iof" should be --of--;
Col. 5, line 9, "v*" should be --$\vec{v}*$--;
Col. 5, line 12, "|v*|" should be --$|\vec{v}*|$--; same line, "v*" should be $\vec{v}*$--;
Col. 5, line 14, "|v*|" should be --$|\vec{v}*|$--;
Col. 5, line 45, "|v*|" should be --$|\vec{v}*|$--;
Col. 5, line 46, "v*" should be --$\vec{v}*$--;
Col. 5, line 50, "|v*|" should be --$|\vec{v}*|$--.
Col. 6, line 18, "|v*|" should be --$|\vec{v}*|$--.

Signed and Sealed this

Twenty-second Day of January, 1991

Attest:

HARRY F. MANBECK, JR.

*Attesting Officer*  *Commissioner of Patents and Trademarks*